US011689693B2

(12) United States Patent
Lu et al.

(10) Patent No.: US 11,689,693 B2
(45) Date of Patent: Jun. 27, 2023

(54) VIDEO FRAME INTERPOLATION METHOD AND DEVICE, COMPUTER READABLE STORAGE MEDIUM

(71) Applicant: BOE TECHNOLOGY GROUP CO., LTD., Beijing (CN)

(72) Inventors: Yunhua Lu, Beijing (CN); Guannan Chen, Beijing (CN); Ran Duan, Beijing (CN); Lijie Zhang, Beijing (CN); Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 148 days.

(21) Appl. No.: 17/265,568

(22) PCT Filed: Apr. 30, 2020

(86) PCT No.: PCT/CN2020/088490
§ 371 (c)(1),
(2) Date: Feb. 3, 2021

(87) PCT Pub. No.: WO2021/217653
PCT Pub. Date: Nov. 4, 2021

(65) Prior Publication Data
US 2022/0116567 A1 Apr. 14, 2022

(51) Int. Cl.
*H04N 7/01* (2006.01)
*G06N 20/00* (2019.01)

(52) U.S. Cl.
CPC .......... *H04N 7/0135* (2013.01); *G06N 20/00* (2019.01); *H04N 7/0145* (2013.01)

(58) Field of Classification Search
CPC .. H04N 7/0135; H04N 7/0145; H04N 7/0127; G06N 20/00; G06T 3/4007; G06T 3/4046
See application file for complete search history.

(56) References Cited

U.S. PATENT DOCUMENTS 9,743,078 B2 * 8/2017 DeForest ............. H04N 19/543
10,701,394 B1 * 6/2020 Caballero ................ G06N 3/08
(Continued)

FOREIGN PATENT DOCUMENTS

CN   105578184 A    5/2016
CN   108322685 A    7/2018
(Continued)

OTHER PUBLICATIONS

Liu, et al., "Deep Video Frame Interpolation Using Cyclic Frame Generation", Association for the Advancement of Artificial Intelligence, 2019.
(Continued)

*Primary Examiner* — Michael Lee
(74) *Attorney, Agent, or Firm* — Perilla Knox & Hildebrandt LLP; Kenneth A. Knox

(57) ABSTRACT

A video frame interpolation method and device, and a computer-readable storage medium are described. The method includes: inputting at least two image frames into a video frame interpolation model to obtain at least one frame-interpolation image frame, training the initial model using a first loss to obtain a reference model, copying the reference model to obtain three reference models with shared parameters, selecting different target sample images according to a preset rules to train the first/second reference model to obtain a first/second frame-interpolation result; selecting third target sample images from the first/second frame-interpolation result to train the third reference model to obtain the frame-interpolation result, obtaining a total loss of the first training model based on the frame-interpolation result and the sample images, adjusting parameters of the first training model based on the total loss, and using a parameter model via a predetermined number of iterations as the video frame interpolation model.

20 Claims, 3 Drawing Sheets

(56) References Cited

U.S. PATENT DOCUMENTS

| | | | | |
|---|---|---|---|---|
| 11,394,900 B1 * | 7/2022 | Sandofsky | ............ | H04N 5/265 |
| 2007/0087756 A1 * | 4/2007 | Hoffberg | ............. | G06Q 20/065 |
| | | | | 455/450 |
| 2020/0012940 A1 | 1/2020 | Liu et al. | | |
| 2020/0314382 A1 * | 10/2020 | Hu | ..................... | G06N 3/0454 |

FOREIGN PATENT DOCUMENTS

| | | | | | |
|---|---|---|---|---|---|
| CN | 105578184 B | | 11/2018 | | |
| CN | 109145922 A | | 1/2019 | | |
| CN | 109479098 A | * | 3/2019 | ............ | G06T 11/60 |
| CN | 109872276 A | | 6/2019 | | |
| CN | 109905624 A | | 6/2019 | | |
| CN | 110191299 A | | 8/2019 | | |
| CN | 110824587 A | | 2/2020 | | |
| CN | 111292349 A | * | 6/2020 | | |
| CN | 110191299 B | | 8/2020 | | |
| CN | 109905624 B | | 10/2020 | | |
| CN | 112104830 A | * | 12/2020 | ............ | G06T 7/248 |
| WO | 2017128893 A1 | | 8/2017 | | |
| WO | 2018170393 A2 | | 9/2018 | | |
| WO | 2018170393 A3 | | 9/2018 | | |
| WO | 2018170393 A9 | | 9/2018 | | |
| WO | 2020177108 A1 | | 9/2020 | | |

OTHER PUBLICATIONS

Written Opinion of the International Searching Authority for PCT/CN2020/088490 dated Jan. 27, 2021.

* cited by examiner

VIDEO FRAME INTERPOLATION METHOD AND DEVICE, COMPUTER READABLE STORAGE MEDIUM

CROSS-REFERENCE TO RELATED APPLICATION

The present application is a national phase application under 35 U.S.C. § 371 of International Patent Application No. PCT/CN2020/088490 filed on Apr. 30, 2020, where the contents of which are hereby incorporated by reference in their entirety herein.

TECHNICAL FIELD

The present disclosure relates to the field of image processing technologies, and in particular, to a video frame interpolation method and device, and a computer-readable storage medium.

BACKGROUND

Video frame interpolation is a research direction in the field of digital image processing and computer vision. With the video frame interpolation technologies, frame rate of a video can be increased. Traditional methods for increasing the frame rate of the video easily cause problems such as ghosting, distortion, and blur. In recent years, deep learning technologies have made a lot of breakthroughs in various application fields. A video frame interpolation method based on deep learning can improve the above problems to a certain extent, but it is prone to artifacts.

SUMMARY

According to a first aspect of the present disclosure, there is provided a video frame interpolation method, including:
inputting at least two image frames into a video frame interpolation model to obtain at least one frame-interpolation image frame;
where the video frame interpolation model is obtained by training an initial model;
the training the initial model includes:
obtaining the initial model and sample images, and training the initial model by using a first loss to obtain a reference model;
obtaining a first training model including three identical reference models, and selecting two first target sample image frames from the sample images according to a preset rule, and inputting them into a first reference model of the first training model to obtain a first frame-interpolation result;
selecting two second target sample image frames from the sample images according to the preset rule, and inputting them into a second reference model of the first training model to obtain a second frame-interpolation result;
selecting one frame-interpolation image from the first frame-interpolation result and the second frame-interpolation result respectively according to the preset rule, and the frame-interpolation images are used as two third target sample image frames that are input into a third reference model of the first training model for calculation to obtain a third frame-interpolation result;
adjusting parameters of the first training model based on total loss of the first training model, where the total loss of the first training model is obtained based on the first frame-interpolation result, the second frame-interpolation result, and the third frame-interpolation result and the sample images, and parameters of each reference model in the first training model are shared; and
using a parameter model obtained via a predetermined number of iterations as the video frame interpolation model.

In an exemplary embodiment of the present disclosure, the sample images includes at least one set of sub-sample images, the at least one set of sub-sample images includes N image frames, and the preset rule includes:
selecting a first image frame and an (N−2)th image frame as the two first target sample image frames, and the first frame-interpolation result includes first frame-interpolation images corresponding to the second image frame to an (N−3)th image frame respectively;
selecting a third image frame and an Nth image frame as the two second target sample image frames, and the second frame-interpolation result includes second frame-interpolation images corresponding to a fourth image frame to an (N−1)th image frame respectively; and
selecting the first frame-interpolation image corresponding to the second image frame and the second frame-interpolation image corresponding to the (N−1)th image frame as the two third target sample image frames;
where N is a positive integer greater than or equal to 5.

In an exemplary embodiment of the present disclosure, the first training model further includes a fourth reference model, and the fourth reference model is the same as the first reference model, and the method further includes:
selecting two fourth target sample image frames from the sample images according to the preset rule, and inputting them into the fourth reference model to obtain a fourth frame-interpolation result;
where the total loss of the first training model is obtained based on the first frame-interpolation result, the second frame-interpolation result, the third frame-interpolation result, the fourth frame-interpolation result, and the sample images, and parameters of the first training model are shared with the fourth reference model.

In an exemplary embodiment of the present disclosure, the preset rule further includes:
selecting a first image frame and an Nth image frame in the at least one set of sub-sample images as the two fourth target sample image frames;
where N is a positive integer greater than or equal to 5.

In an exemplary embodiment of the present disclosure, the total loss of the first training model includes a first sub-loss, a second sub-loss, a third sub-loss, and a fourth sub-loss;
the first sub-loss is the loss between the first frame-interpolation result and first target frame-interpolation result, and the second sub-loss is the loss between the second frame-interpolation result and second target frame-interpolation result, the third sub-loss is the loss between the third frame-interpolation result and third target frame-interpolation result, and the fourth sub-loss is the loss between the fourth frame-interpolation result and fourth target frame-interpolation result;
where the first target frame-interpolation result includes the second image frame to the (N−3)th image frame in N image frames, and the second target frame-interpolation result includes the fourth image frame to the (N−1)th image frame in the N image frames, the third target frame-interpolation result includes the third image frame to the (N−2)th image frame in the N image frames, and the fourth target frame-interpolation result includes the fourth image frame in the N image frames.

In an exemplary embodiment of the present disclosure, the method further includes:

calculating a first gradient based on the first frame-interpolation result and the sample images, storing the first frame-interpolation result and the first gradient, and clearing a calculation map of the first reference model;

calculating a second gradient based on the second frame-interpolation result and the sample images, storing the second frame-interpolation result and the second gradient, and clearing a calculation map of the second reference model;

calculating a third gradient based on the third frame-interpolation result and the sample images, storing the third frame-interpolation result and the third gradient, and clearing a calculation map of the third reference model; and calculating a fourth gradient based on the fourth frame-interpolation result and the sample images, storing the fourth frame-interpolation result and the fourth gradient, and clearing a calculation map of the fourth reference model.

In an exemplary embodiment of the present disclosure, N=7.

In an exemplary embodiment of the present disclosure, an optimizer of a training method is a Radam combined with Lookahead optimizer, and a hierarchical adaptive rate scaling method is adopted to set a learning rate for the optimizer.

According to an aspect of the present disclosure, there is provided a video frame interpolation device, including a processor and a memory, where the memory is configured to store program instructions, and the processor is configured to call the program instructions to perform the following operations:

inputting at least two image frames into a video frame interpolation model to obtain at least one frame-interpolation image frame;

where the video frame interpolation model is obtained by training an initial model;

the training the initial model includes:

obtaining the initial model and sample images, and training the initial model using a first loss to obtain a reference model;

obtaining a first training model including three identical reference models, selecting two first target sample image frames from the sample images according to a preset rule, and inputting them into a first reference model of the first training model to obtain a first frame-interpolation result;

selecting two second target sample image frames from the sample images according to the preset rule, and inputting them into a second reference model of the first training model to obtain a second frame-interpolation result;

selecting one frame-interpolation image from the first frame-interpolation result and the second frame-interpolation result respectively according to the preset rule, and using them as two third target sample image frames that are input into a third reference model of the first training model for calculation to obtain a third frame-interpolation result;

adjusting parameters of the first training model based on total loss of the first training model, where the total loss of the first training model is obtained based on the first frame-interpolation result, the second frame-interpolation result, and the third frame-interpolation result and the sample images, and parameters of each reference model in the first training model are shared; and using a parameter model obtained via a predetermined number of iterations as the video frame interpolation model.

In an exemplary embodiment of the present disclosure, the sample images includes at least one set of sub-sample images, the at least one set of sub-sample images includes N image frames, and the preset rule includes:

selecting a first image frame and an (N−2)th image frame as the two first target sample image frames, and the first frame-interpolation result includes first frame-interpolation images respectively corresponding to the second image frame to an (N−3)th image frame;

selecting a third image frame and an Nth image frame as the two second target sample image frames, and the second frame-interpolation result includes second frame-interpolation images corresponding to a fourth image frame to an (N−1)th image frame respectively; and selecting the first frame-interpolation image corresponding to the second image frame and the second frame-interpolation image corresponding to the (N−1)th image frame as the two third target sample image frames;

where N is a positive integer greater than or equal to 5.

In an exemplary embodiment of the present disclosure, the first training model further includes a fourth reference model, and the fourth reference model is the same as the first reference model, and the device further includes:

selecting two fourth target sample image frames from the sample images according to the preset rule, and inputting them into the fourth reference model to obtain a fourth frame-interpolation result;

where the total loss of the first training model is obtained based on the first frame-interpolation result, the second frame-interpolation result, the third frame-interpolation results, the fourth frame-interpolation result, and the sample images, and parameters of the first training model are shared with the fourth reference model.

In an exemplary embodiment of the present disclosure, the preset rule further includes:

selecting a first image frame and an Nth image frame in the at least one set of sub-sample images as the two fourth target sample image frames;

where N is a positive integer greater than or equal to 5.

In an exemplary embodiment of the present disclosure, the total loss of the first training model includes a first sub-loss, a second sub-loss, a third sub-loss, and a fourth sub-loss;

the first sub-loss is the loss between the first frame-interpolation result and a first target frame-interpolation result, and the second sub-loss is a loss between the second frame-interpolation result and a second target frame-interpolation result, the third sub-loss is loss between the third frame-interpolation result and a third target frame-interpolation result, and the fourth sub-loss is the loss between the fourth frame-interpolation result and a fourth target frame-interpolation result;

and the first target frame-interpolation result includes the second image frame to the (N−3)th image frame in N image frames, and the second target frame-interpolation result includes the fourth image frame to the (N−1)th image frame in the N image frames, the third target frame-interpolation result includes the third image frame to the (N−2)th image frame in the N image frames, and the fourth target frame-interpolation result includes the fourth image frame in the N image frames.

According to an aspect of the present disclosure, a computer program is stored thereon, and the program, when executed by a processor, implements the video frame interpolation method as described in any one of the above.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is apparent that the drawings in the following description show only some of the embodiments of the present disclosure, and other drawings may be obtained by those skilled in the art without paying inventive labor.

DETAILED DESCRIPTION

Figure 1:
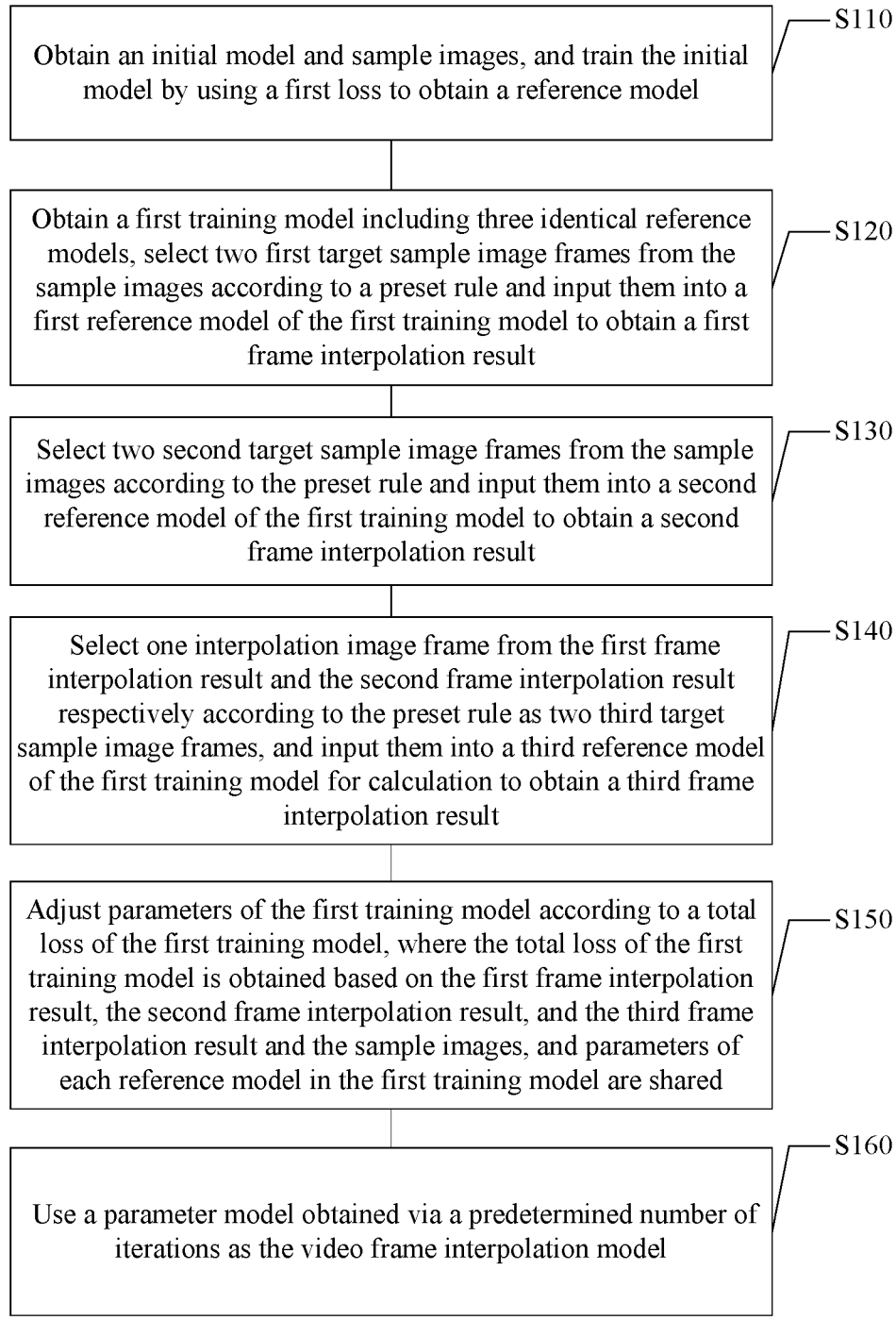
FIG. 1 schematically shows a flowchart of a video frame interpolation method in an exemplary embodiment of the present disclosure.

Exemplary embodiments will now be described more fully with reference to the accompanying drawings. However, the embodiments can be implemented in a variety of forms and should not be construed as being limited to the examples set forth herein; rather, these embodiments are provided so that the present disclosure will be more complete so as to convey the idea of the exemplary embodiments to those skilled in this art. The described features, structures, or characteristics in one or more embodiments may be combined in any suitable manner.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

Generally, methods based on deep learning are used to improve an effect of frame interpolation by increasing complexities of a network structure and the number of parameters. However, more computing resources and computing time may be consumed.

The present disclosure provides a method and device for video frame interpolation, a computer-readable storage medium, and an electronic device, so as to partly overcome the problem of waste of computing resources and computing time in video frame interpolation methods in the related art.

In this exemplary embodiment, there is provided a video frame interpolation method first. The video frame interpolation method may include inputting at least two image frames into a video frame interpolation model to obtain at least one frame-interpolation image frame.

In this exemplary embodiment, at least two image frames (e.g., two frames, three frames, four frames and so on) can be input into the video frame interpolation model, and the number of image frames input is not specifically limited in this exemplary embodiment. At least one frame-interpolation image frame between any two image frames may be input via the video frame interpolation model.

The video frame interpolation model is obtained by performing training on an initial model.

Referring to FIG. 1, the initial model is trained through steps described below.

In S110, the initial model and sample images are obtained, and the initial model is trained by using a first loss to obtain a reference model.

In S120, a first training model including three identical reference models is obtained, and two first target sample image frames are selected from the sample images according to a preset rule and are input into a first reference model of the first training model so as to obtain a first frame-interpolation result.

In S130, two second target sample image frames are selected from the sample images according to the preset rule and are input into a second reference model of the first training model, so as to obtain a second frame-interpolation result.

In S140, one interpolation image frame is selected from the first frame-interpolation result and one interpolation image frame is selected from the second frame-interpolation result according to the preset rule, and the selected two interpolation image frames are served as third target sample image frames and are input into a third reference model of the first training model for calculation to obtain a third frame-interpolation result.

In S150, parameters of the first training model are adjusted according to total loss of the first training model, where the total loss of the first training model is obtained based on the first frame-interpolation result, the second frame-interpolation result, and the third frame-interpolation result and the sample images, and parameters are shared by each reference model of the first training model.

In S160, a parameter model obtained via a predetermined number of iterations is used as the video frame interpolation model.

According to the video frame interpolation method provided in this exemplary embodiment, on the one hand, the third target sample images is selected, according to the preset rule, from the first frame-interpolation result obtained by the first reference model and the second frame-interpolation result obtained by the second reference model, and then the third target sample images are input into the third reference model, thereby training the three identical reference training models in a cascaded manner. In this way, accuracy for training the model can be improved without increasing the complexities of the network structure and the number of parameters, thereby improving the effect of video frame interpolation. On the other hand, the initial model is trained in the cascaded manner, and multiple iterations are executed so that the initial model can be trained more accurately even when the number of the samples is small. Further, since the number of samples required is less, the calculation amount and calculation time will be less, thereby saving calculation resources and calculation time.

Hereinafter, each step of the video frame interpolation method in this exemplary embodiment will be described in more detail with reference to the accompanying drawings and embodiments.

In step S110, an initial model and sample images are obtained, and the initial model is trained by using the first loss to obtain a reference model.

In an exemplary embodiment of the present disclosure, a server may first obtain the initial model and the sample images. To train the initial model, the sample images include at least three image frames, for example five image frames, six image frames, and seven image frames or more, which are not specifically limited in this exemplary embodiment.

In this exemplary embodiment, when a frame interpolation training is performed on the initial model, 2× frame interpolation method can be selected for the training. When the number of sample images meets certain conditions, 3× frame interpolation method, 4× frame interpolation method or the like can also be selected for the training. For example, when the sample images only include three image frames, only the 2× frame interpolation method can be used for training the initial model. When the sample images includes five image frames, the 2× frame interpolation method, the 3× frame interpolation method or the 4× frame interpolation method can be used for training the initial model to obtain the reference model, which is not specifically limited in this exemplary embodiment.

In an exemplary embodiment of the present disclosure, a $L_1$ loss function may be used for calculating an initial $L_1$ norm loss between an initial frame-interpolation result obtained from the initial model and an image in the sample images, where the $L_1$ loss function is:

$$L_1(x,x')=|x-x'|_1$$

where x is a video frame of the sample images, and x' is an output of the initial model.

In this exemplary embodiment, training the initial model by the 2× frame interpolation method is taken as an example for detailed description. For example, the sample images include three image frames, and the first image frame and the third frame image are input into the initial model to obtain the initial frame-interpolation result; then the above $L_1$ loss function is used for calculating the initial $L_1$ norm loss between the initial frame-interpolation result and the second sample image frame, and an initial gradient is calculated according to the obtained initial $L_1$ norm loss, and then a offset and weight of the initial model are updated with the initial gradient to obtain a reference model.

In step S120, a first training model including three identical reference models is obtained, two first target sample image frames are selected from the sample images according to a preset rule and are input into the first reference model of the first training model to obtain a first frame-interpolation result.

In an exemplary embodiment of the present disclosure, the server may first copy the reference model to obtain the first training model, and the first training model includes three identical reference models, which are named as the first reference model, the second reference model and the third reference model.

In this exemplary embodiment, to train the first reference model, the second reference model, and the third reference model, the sample images should include at least five image frames, e.g., six image frames, seven image frames or more, which is not specifically limited in this exemplary embodiment.

In this exemplary embodiment, the server may select, according to the preset rules, two image frames in the sample images as the first target sample images of the first reference model. Specifically, the sample images may include at least one set of sub-sample images, where the at least one set of sub-sample images has N image frames, and the first image frame and an (N−2)th image frame can be selected as the first target sample images; and the first frame-interpolation result can be obtained by inputting the first image frame and the (N−2)th image frame to the first reference model. The first frame-interpolation result can include first frame-interpolation images corresponding to the second image frame to the (N−3)th image frame.

Figure 2:
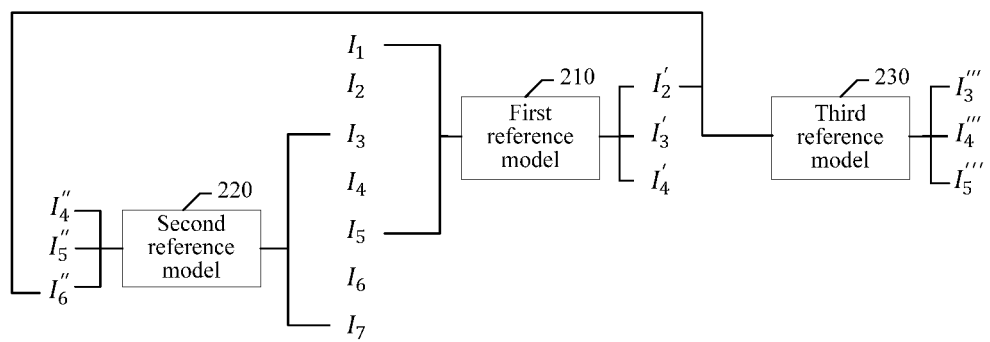
FIG. 2 schematically shows a cascade structure diagram of a first, second, and third reference models in an exemplary embodiment of the present disclosure.

Specifically, referring to FIG. 2, N being equal to 7 is taken as an example for detailed description, consecutive images in the sample images are represented by $I_1$, $I_2$, $I_3$, $I_4$, $I_5$, $I_6$, and $I_7$. In this case, the first target sample images input into the first reference model 210 may be $I_1$ and $I_5$, and the first frame-interpolation result obtained from the first reference model 210 includes the first interpolation images corresponding to $I_2$, $I_3$, $I_4$, which are specifically represented by $I_2'$, $I_3'$, $I_4'$. $I_2$, $I_3$, $I_4$ are first target frame-interpolation results of the first reference model.

In step S130, two second target sample image frames are selected from the sample images according to the preset rule, and are input into the second reference model of the first training model to obtain the second frame-interpolation result.

In an exemplary embodiment of the present disclosure, the server may select, according to the preset rule, two image frames in the sample images as the second target sample images of the second reference model 220. Specifically, the sample images may include at least one set of sub-sample images, where the at least one set of sub-sample images has N image frames, and the third image frame and the Nth image frame may be selected as the second target sample images; the second frame-interpolation result can be obtained by inputting the third image frame and the Nth image frame to the second reference model 220. The second frame-interpolation result may include second frame-interpolation images corresponding to the fourth image frame to the (N−1)th image frame.

Specifically, referring to FIG. 2, N being equal to 7 is taken as an example for detailed description, consecutive images in the sample images are represented by $I_1$, $I_2$, $I_3$, $I_4$, $I_5$, $I_6$, and $I_7$. In this case, the second target sample images input into the second reference model 220 may be $I_3$ and $I_7$, and the second frame-interpolation result obtained from the second reference model 220 includes second frame-interpolation images corresponding to $I_4$, $I_5$, $I_6$, which are specifically represented by $I_4''$, $I_5''$, $I_6''$. $I_4$, $I_5$, $I_6$ are the second target frame-interpolation result of the second reference model.

In step S140, according to the preset rule, one frame-interpolation image is selected from the first frame-interpolation result and one frame-interpolation image is selected from the second frame-interpolation result, and the selected frame-interpolation images are used as two third target sample image frames that are input into the third reference model of the first training model for calculation to obtain the third frame-interpolation result.

In an exemplary embodiment of the present disclosure, the server may select one image frame from each of the first frame-interpolation result and the second frame-interpolation result as the inputs to the third reference model 230 for calculation to obtain the third frame-interpolation result. Specifically, the sample images may include at least one set of sub-sample images, where the at least one set of sub-sample images has N image frames, and the first frame-interpolation image corresponding to the second image frame and the second frame-interpolation image corresponding to the (N−1)th image frame can be selected as the inputs to the third reference model 230.

Specifically, referring to FIG. 2, N being equal to 7 is taken as an example for detailed description, consecutive images in the sample images are represented by $I_1$, $I_2$, $I_3$, $I_4$, $I_5$, $I_6$, and $I_7$. In this case, the first target sample images input into the first reference model 210 may be $I_1$ and $I_5$, and the first frame-interpolation result obtained from the first reference model 210 includes the first frame-interpolation images corresponding to $I_2$, $I_3$, $I_4$, which are specifically represented by $I_2'$, $I_3'$, $I_4'$. The second target sample images input into the second reference model 220 may be $I_3$ and $I_7$, and the second frame-interpolation result obtained from the second reference model 220 includes the second frame-interpolation images corresponding to $I_4$, $I_5$, $I_6$, which are specifically represented by $I_4''$, $I_5''$, $I_6''$. $I_2'$ and $I_6''$ can be selected as the inputs to the third reference model 230. The third frame-interpolation result can include $I_3'$, $I_4'''$, $I_5'''$. At this point, $I_3$, $I_4$, $I_5$ are the third target frame-interpolation result of the third reference model.

In step S150, the parameters of the first training model are adjusted according to the total loss of the first training model, and the total loss of the first training model is obtained based on the first frame-interpolation result, the second frame-interpolation result, and the third frame-interpolation result and the sample images, and parameters are shared by each reference model in the first training model.

In an exemplary embodiment of the present disclosure, the above total loss may include first sub-loss, second sub-loss and third sub-loss. The first sub-loss is the loss between the first frame-interpolation result and the first target frame-interpolation result, and the second sub-loss is the loss between the second frame-interpolation result and second target frame-interpolation result, and the third sub-loss is the loss between the third frame-interpolation result and the third target frame-interpolation result. The first sub-loss, the second sub-loss and the third sub-loss all include the L1 norm loss, a Laplacian pyramid loss and a multi-scale structural similarity exponential loss.

In this exemplary embodiment, the aforementioned parameters may include offset and weight. During the training process, the parameters are shared by the first reference model, the second reference model, and the third reference model. That is to say, during training, the offset and the weight of the first reference model, the second reference model, and the third reference model are adjusted synchronously, and the adjustment range is the same.

In an exemplary embodiment of the present disclosure, after each frame-interpolation result is obtained, the loss may be calculated based on the frame-interpolation result, and then the gradient of each reference model is calculated based on the loss, and after the frame-interpolation result and the gradient are stored, the computation map of this model is cleared for releasing the model.

Specifically, N being equal to 7 is taken as an example for detailed description. A second function can be used to calculate the first sub-loss between the first frame-interpolation result and the first target frame-interpolation result in the sample images, that is, a loss error between $I_2'$, $I_3'$, $I_4'$ and $I_2$, $I_3$, $I_4$. The second function can be a combined frame-interpolation loss function, and the combined frame-interpolation loss function can be:

$$L = w_1 L_1 + w_2 L_{lap} + w_3 L_{ms-ssim}$$

where $L_1$ is the $L_1$ loss function, $L_{lap}$ is the Laplacian pyramid loss function, $L_{ms-ssim}$ is the multi-scale structural similarity exponential loss function, and $w_1$, $w_2$, $w_3$ are weights of each loss function.

Specifically, $L_1$ represents the above $L_1$ loss function, which has been described in detail above, so it will not be repeated here.

A formula of the Laplacian pyramid loss function $L_{lap}$ is as follows:

$$L_{lap}(x, x') = \sum_j 2^j |L_p^j(x) - L_p^j(x')|_1$$

where $L_p^j$ is a j-th Laplacian pyramid, x is a video frame of the sample images, and x' is the output of the initial model. Since the video contains moving objects of different sizes, different motion speeds, and different depths of field, compared with the $L_1$ loss function, the Laplacian pyramid loss function can be used to calculate the loss under different scales, which can improve the accuracy of the video frame interpolation.

$L_{ms-ssim}$ represents the multi-scale structural similarity exponential loss function, and the specific formula is as follows:

$$L_{MS-SSIM} = 1 - MS\text{-}SSIM(x,x')$$

where x is a video frame of the sample images, and x' is the output of the initial model.

Since the video contains moving objects of different sizes, different motion speeds, and different depths of field and has multi-scale characteristics, the use of the multi-scale structural similarity exponential loss function can better improve the accuracy of the video frame interpolation.

In this exemplary embodiment, the calculation of the loss of each reference model in the first training model can be performed separately after each reference model obtains the output during training, or the calculation can be performed after all reference models have obtained the outputs. In order to prevent the multiple models from interfering with each other, improve computing efficiency, and reduce occupied resources of the server, the loss and gradient of each reference model can be calculated in sequence once the output of the reference model is obtained, and the calculation map of this reference model is cleared after the gradients and output results are saved.

As shown in FIG. 2, when the first training model includes the first reference model, the second reference model, and the third reference model, the loss is calculated in the order of the first reference model to the third reference model. Specifically, the first frame-interpolation result of the first reference model is obtained, and the first loss error of the first reference model is obtained based on the first frame-interpolation result and the first target frame-interpolation result. The first gradient is calculated based on the first loss error, and then the first gradient and the first frame-interpolation result are stored. Then, the calculation map of the first reference model 210 is cleared to release the first reference model. Next, two second target sample image frames are input into the second reference model to obtain the second frame-interpolation result, and the second loss error of the second reference model is obtained based on the second frame-interpolation result and the second target frame-interpolation result. Then, the second gradient is obtained through calculation and the second gradient and the second frame-interpolation result are stored, and the calculation map of the second reference model 220 is cleared to release the second reference model. Still further, two third target sample image frames are input into the third reference model to obtain the third frame-interpolation result, and the third loss error of the third reference model is obtained based on the third frame-interpolation result and the third target frame-interpolation result. Then, the third gradient is obtained through calculation and the third gradient and the third frame-interpolation result are stored, and the calculation map of the third reference model 230 is cleared to release the third reference model. Finally, the total loss of the first training model is calculated, and the parameters of the first training model are adjusted according to the total loss.

In this exemplary embodiment, the loss error between $I_2'$, $I_3'$, $I_4'$ and $I_2$, $I_3$, $I_4$ is calculated by using the second function to obtain the first error loss. The second function has been described in detail above, so it will not be repeated here.

In this exemplary embodiment, the second function may be used to calculate the second error loss between the second frame-interpolation result and the sample images, that is, the loss error between $I_4''$, $I_5''$, $I_6''$ and $I_4$, $I_5$, $I_6$. The second function has been described in detail above, so it will not be repeated here.

In this exemplary embodiment, the second function may be used to calculate the third error loss between the third frame-interpolation result and the sample images, that is, the loss error between $I_3'''$, $I_4'''$, $I_5'''$ and $I_3$, $I_4$, $I_5$. The second function has been described in detail above, so it will not be repeated here.

In this exemplary embodiment, the third gradient is calculated based on the calculated third loss error.

In this exemplary embodiment, vector addition is performed on the obtained the first gradient, the second gradient, and the third gradient to obtain a target gradient, and then the offsets and weights of the reference models are updated according to the target gradient to complete the training of the reference models.

In another exemplary embodiment of the present disclosure, after the first frame-interpolation result, the second frame-interpolation result, and the third frame-interpolation result are obtained, the first sub-loss, the second sub-loss, and the third sub-loss can be calculated at the same time. Next, the total loss is calculated based on the first sub-loss, the second sub-loss, and the third sub-loss, and then the target gradient is calculated based on the total loss.

In an exemplary embodiment of the present disclosure, the first training model may further include a fourth reference model. The fourth reference model is the same as the first reference model, the second reference model, and the third reference model, and the parameters are shared by these reference models. That is, the parameters of the fourth reference model and the parameters of the first reference model, the second reference model, and the third reference model are adjusted simultaneously with the same adjustment range.

In an exemplary embodiment of the present disclosure, the calculation map of the third reference model may be cleared first, and two fourth target sample image frames may be determined according to the preset rule and are input into the fourth reference model to obtain the fourth frame-interpolation result. A fourth gradient is calculated based on the fourth frame-interpolation result.

In an exemplary embodiment of the present disclosure, the server may determine, according to the preset rule, two image frames in the sample images as the fourth target sample images of the fourth reference model. Specifically, the sample images may include at least one set of sub-sample images, where the at least one set of sub-sample images has N image frames, and the first image frame and the Nth image frame can be selected as the fourth target sample images; the first image frame and the Nth image frame are input into the fourth reference model to obtain the fourth frame-interpolation result.

Figure 3:
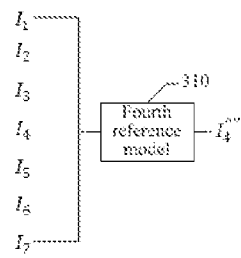
FIG. 3 schematically shows a training data diagram of a fourth reference model in an exemplary embodiment of the present disclosure.

Specifically, referring to FIG. 3, N being equal to 7 is taken as an example for detailed description, consecutive images in the sample images are represented by $I_1$, $I_2$, $I_3$, $I_4$, $I_5$, $I_6$, and $I_7$. In this case, the fourth target sample images input into the fourth reference model 310 may be $I_1$ and $I_7$, and the fourth frame-interpolation result obtained from the fourth reference model 310 includes the fourth frame-interpolation image corresponding to $I_4$, which is specifically represented by $I_4''''$. That is to say, $I_4$ is the fourth target frame-interpolation result of the fourth reference model.

In this exemplary embodiment, the second function may be used to calculate the fourth sub-loss between the fourth frame-interpolation result and the sample images, that is, the loss error between $I_4''''$ and $I_4$. The second function has been described in detail above, so it will not be repeated here.

In this exemplary embodiment, the fourth gradient is calculated based on the calculated fourth loss error. The target gradient is updated based on the fourth gradient, that is, the vector addition is performed on the first gradient, the second gradient, the third gradient, and the fourth gradient to obtain a new target gradient.

In another exemplary embodiment of the present disclosure, after first frame-interpolation result, the second frame-interpolation result, the third frame-interpolation result, and the fourth frame-interpolation result are obtained, the first sub-loss, the second sub-loss, the third sub-loss and the fourth sub-loss are calculated at the same time. Next, the total loss is calculated based on the first sub-loss, the second sub-loss, the third sub-loss and fourth sub-loss, and then the target gradient is calculated based on the total loss.

In this exemplary embodiment, the 2× frame interpolation training is performed on the initial model to obtain the reference model, and the first reference model, the second reference model, and the third reference model are cascaded, and all the reference models are trained through the 4× frame interpolation training, and the 6× frame interpolation training is performed on the fourth reference model. In this way, the amount of training data required is less, and only seven frames of sample images are required to complete the 2×, 4× and 6× frame interpolation training, and higher training accuracy can be guaranteed at the same time.

In an exemplary embodiment of the present disclosure, the present disclosure may use a combined optimizer to complete the training of the reference models. The above combined optimizer is obtained by performing the hierarchical adaptive rate scaling the learning rate in a case with integration of the RAdam optimizer and the LookAhead optimizer.

In this example implementation, the RAdam optimizer is selected, and on this basis, the hierarchical adaptive rate scales the learning rate is used in combination with the LookAhead optimization method, which not only improves the training speed, but also obtains the video frame interpolation model with better effect.

In step S160, the parameter model obtained via predetermined number of iterations is used as the video frame interpolation model.

In an exemplary embodiment of the present disclosure, the foregoing initial model may be subjected to the foregoing training process for multiple times, that is, a reference model is obtained by training the foregoing initial model for a preset number of times, and the reference model is used as the video frame interpolation model. The preset number of times may be a positive integer greater than or equal to 1, for example, 1, 2, 3, etc., which is not specifically limited in this exemplary embodiment.

The following describes device embodiments of the present disclosure, which can be configured to implement the above-mentioned video frame interpolation method of the present disclosure. In addition, in an exemplary embodiment of the present disclosure, there is also provided a video frame interpolation device. The foregoing video frame interpolation device may include a processor and a memory. The memory may be configured to store program instructions, and the processor may be configured to execute the foregoing program instructions to implement the foregoing video frame interpolation method.

The detailed description of the implementation of the above video frame interpolation method has been explained in detail. Therefore, for details that are not disclosed in the device embodiments of the present disclosure, please refer to the foregoing embodiments of the video frame interpolation method of the present disclosure.

It should be noticed that although several modules or units of apparatus for action execution are mentioned in the detailed description above, such division is not mandatory. Indeed, according to embodiments of the present disclosure, the features, and functions of two or more modules or units described above may be embodied in one circuit or unit. Conversely, the features and functions of one of the modules or units described above may be further divided into a plurality of modules or units to embody.

In addition, an electronic device capable of implementing the video frame interpolation method is further provided in the present disclosure.

Those skilled in the art may understand that various aspects of the present disclosure may be implemented as a system, method, or program product. Therefore, various aspects of the present disclosure may be embodied in the following forms: a complete hardware implementation, a complete software implementation (including firmware, microcode, etc.), or a combination of hardware and software, which may be collectively referred to herein 'circuit', 'module', or 'system'.

In an exemplary embodiment of the present disclosure, there is also provided a computer-readable storage medium on which a program product capable of implementing the above-mentioned method of the present specification is stored. In some possible implementation manners, aspects of the present disclosure may also be implemented in the form of a program product, which comprises program code. When the program product runs on a terminal device, the program code is used to make the terminal device perform the steps according to various exemplary embodiments of the present disclosure described in the above-mentioned "exemplary method" section of this specification.

Figure 4:
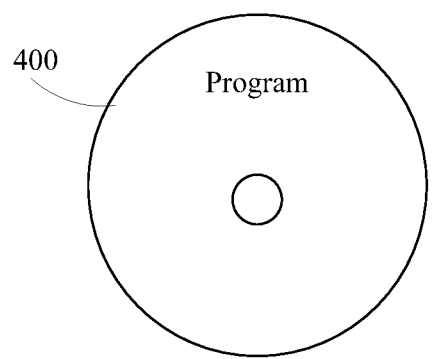
FIG. 4 schematically shows a schematic diagram of a computer-readable storage medium according to some embodiments of the present disclosure.

Referring to FIG. 4, a program product 400 for implementing the above method according to an embodiment of the present disclosure is described. The program product 400 can use a portable compact disc read-only memory (CD-ROM) and includes program codes, which may run on a terminal device, for example, a personal computer. However, the program product of the present disclosure is not limited thereto. In this document, the readable storage medium may be tangible medium containing or storing program, and the program may be used by or in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media comprise: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may comprise a data signal in baseband or propagated as a part of a carrier wave, which carries readable program code. Such a propagated data signal may take many forms, comprising but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device.

The program code embodied on the readable medium may be transmitted using any appropriate medium, comprising but not limited to wireless, wired, optical cable, RF, etc., or any suitable combination of the foregoing.

The program code for performing the operations of the present disclosure may be written in any combination of one or more programming languages, which comprise object-oriented programming languages, such as Java, C++, etc. and further comprise conventional procedural programming language, such as 'C' or a similar programming language. The program code may be executed entirely or partly on the user computing device, may be executed as an independent software package, may be executed partly on the user computing device and partly on the remote computing device, or may be executed entirely on the remote computing device or server. In the case of involving remote computing devices, the remote computing devices may be connected to the user computing device via any kind of network, such as a local area network (LAN) or a wide area network (WAN), or it may be connected to external computing devices, for example, connected to external computing devices via the Internet by use of an Internet service provider.

In addition, the above-mentioned drawings are merely a schematic description of process comprised in the method of the exemplary embodiment of the present disclosure, and are not intended to limit the purpose. It is easy to understand that the processes shown in the above drawings does not indicate or limit the chronological order of these processes. In addition, it is also easy to understand that these processes may be performed synchronously or asynchronously in a plurality of modules, for example.

Other embodiments of the present disclosure will be apparent to those skilled in the art after consideration of the specification and practice of the present disclosure disclosed here. The present application is intended to cover any variations, uses, or adaptations of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is indicated by the claims.

What is claimed is:

1. A video frame interpolation method, comprising:
inputting at least two image frames into a video frame interpolation model to obtain at least one frame-interpolation image frame, wherein the video frame interpolation model is obtained by training an initial model and the training the initial model comprises:

obtaining the initial model and sample images, and the training the initial model using a first loss to obtain a reference model;

obtaining a first training model comprising three identical reference models, selecting two first target sample image frames from the sample images according to a preset rule, and inputting the first target sample image frames into a first reference model of the first training model to obtain a first frame-interpolation result;

selecting two second target sample image frames from the sample images according to the preset rule, and inputting the second target sample image frames into a second reference model of the first training model to obtain a second frame-interpolation result;

selecting one frame-interpolation image from the first frame-interpolation result according to the preset rule and selecting one frame-interpolation image from the second frame-interpolation result according to the preset rule, wherein the frame-interpolation images selected are used as two third target sample image frames that are input into a third reference model of the first training model for calculation to obtain a third frame-interpolation result;

adjusting parameters of the first training model based on total loss of the first training model, wherein the total loss of the first training model is obtained based on the first frame-interpolation result, the second frame-interpolation result, and the third frame-interpolation result and the sample images, and the parameters are shared by each reference model of the first training model; and using a parameter model obtained via a predetermined number of iterations as the video frame interpolation model.

2. The method according to claim 1, wherein the sample images comprise at least one set of sub-sample images, the at least one set of sub-sample images comprises N image frames, and the preset rule comprises:

selecting a first image frame and an (N−2)th image frame as the two first target sample image frames, wherein the first frame-interpolation result comprises first frame-interpolation images corresponding to a second image frame to an (N−3)th image frame respectively;

selecting a third image frame and an Nth image frame as the two second target sample image frames, wherein the second frame-interpolation result comprises second frame-interpolation images corresponding to a fourth image frame to an (N−1)th image frame respectively; and selecting the first frame-interpolation image corresponding to the second image frame and the second frame-interpolation image corresponding to the (N−1)th image frame as the two third target sample image frames;

wherein N is a positive integer greater than or equal to 5.

3. The method according to claim 2, wherein the first training model further comprises a fourth reference model, and the fourth reference model is the same as the first reference model, and the method further comprises:

selecting two fourth target sample image frames from the sample images according to the preset rule, and inputting the two fourth target sample image frames into the fourth reference model to obtain a fourth frame-interpolation result;

wherein, the total loss of the first training model is obtained based on the first frame-interpolation result, the second frame-interpolation result, the third frame-interpolation result, the fourth frame-interpolation result, and the sample images, and the parameters of the fourth reference model and the parameters of the first training model are shared by the first training model and the fourth training model.

4. The method according to claim 3, wherein the preset rule further comprises:

selecting the first image frame and the Nth image frame in the at least one set of sub-sample images as the two fourth target sample image frames;

wherein N is a positive integer greater than or equal to 5.

5. The method according to claim 4, wherein the total loss of the first training model comprises a first sub-loss, a second sub-loss, a third sub-loss, and a fourth sub-loss;

wherein the first sub-loss is the loss between the first frame-interpolation result and first target frame-interpolation result, and the second sub-loss is the loss between the second frame-interpolation result and second target frame-interpolation result, the third sub-loss is the loss between the third frame-interpolation result and third target frame-interpolation result, and the fourth sub-loss is the loss between the fourth frame-interpolation result and fourth target frame-interpolation result;

wherein, the first target frame-interpolation result comprises the second image frame to the (N−3)th image frame in the N image frames, and the second target frame-interpolation result comprises the fourth image frame to the (N−1)th image frame in the N image frames, the third target frame-interpolation result comprises the third image frame to the (N−2)th image frame in the N image frames, and the fourth target frame-interpolation result comprises the fourth image frame in the N image frames.

6. The method according to claim 3, further comprising:

calculating a first gradient based on the first frame-interpolation result and the sample images, storing the first frame-interpolation result and the first gradient, and clearing a calculation map of the first reference model;

calculating a second gradient based on the second frame-interpolation result and the sample images, storing the second frame-interpolation result and the second gradient, and clearing a calculation map of the second reference model;

calculating a third gradient based on the third frame-interpolation result and the sample images, storing the third frame-interpolation result and the third gradient, and clearing a calculation map of the third reference model; and calculating a fourth gradient based on the fourth frame-interpolation result and the sample images, storing the fourth frame-interpolation result and the fourth gradient, and clearing a calculation map of the fourth reference model.

7. The method according to claim 3, wherein the first loss comprises a L1 norm loss; the total loss comprises the loss of the first reference model, the loss of the second reference model, the loss of the third reference model, and the loss of the fourth reference model; each of the loss of the first reference model, the loss of the second reference model, the loss of the third reference model, and the loss of the fourth reference model comprises the LI norm loss, a Laplacian pyramid loss and a multi-scale structural similarity exponential loss.

8. The method according to claim 5, wherein N is equal to seven.

9. The method according to claim 1, further comprising:
completing training of the reference model using an optimizer, wherein the optimizer is a Radam combined with a Lookahead optimizer, and
setting a learning rate of the optimizer using a hierarchical adaptive rate scaling method.

10. A video frame interpolation device, comprising a processor and a memory, wherein the memory is configured to store program instructions, and the processor is configured to call the program instructions to perform a method comprising:
inputting at least two image frames into a video frame interpolation model to obtain at least one frame-interpolation image frame, wherein the video frame interpolation model is obtained by training an initial model, and the training the initial model comprises:
obtaining the initial model and sample images, and the training the initial model using a first loss to obtain a reference model;
obtaining a first training model comprising three identical reference models, selecting two first target sample image frames from the sample images according to a preset rule, and inputting the two first target sample image frames into a first reference model of the first training model to obtain a first frame-interpolation result;
selecting two second target sample image frames from the sample images according to the preset rule, and inputting the two second target sample image frames into a second reference model of the first training model to obtain a second frame-interpolation result;
selecting one frame-interpolation image from the first frame-interpolation result according to the preset rule and selecting one frame-interpolation image from the second frame-interpolation result according to the preset rule, wherein the frame-interpolation images selected are used as two third target sample image frames that are input into a third reference model of the first training model for calculation to obtain a third frame-interpolation result;
adjusting parameters of the first training model based on total loss of the first training model, wherein the total loss of the first training model is obtained based on the first frame-interpolation result, the second frame-interpolation result, and the third frame-interpolation result and the sample images, and the parameters are shared by each reference model of the first training model; and
using a parameter model obtained via a predetermined number of iterations as the video frame interpolation model.

11. The device according to claim 10, wherein the sample images comprise at least one set of sub-sample images, the at least one set of sub-sample images comprises N image frames, and the preset rule comprises:
selecting a first image frame and an (N−2)th image frame as the two first target sample image frames, wherein the first frame-interpolation result comprises first frame-interpolation images corresponding to a second image frame to an (N−3)th image frame respectively;
selecting a third image frame and an Nth image frame as the two second target sample image frames, wherein the second frame-interpolation result comprises second frame-interpolation images corresponding to a fourth image frame to an (N−1)th image frame respectively; and
selecting the first frame-interpolation image corresponding to the second image frame and the second frame-interpolation image corresponding to the (N−1)th image frame as the two third target sample image frames;
wherein N is a positive integer greater than or equal to 5.

12. The device according to claim 11, wherein the first training model further comprises a fourth reference model, and the fourth reference model is the same as the first reference model, and the deltiee method further comprises:
selecting two fourth target sample image frames from the sample images according to the preset rule, and inputting the two fourth target sample image frames into the fourth reference model to obtain a fourth frame-interpolation result;
wherein, the total loss of the first training model is obtained based on the first frame-interpolation result, the second frame-interpolation result, the third frame-interpolation result, the fourth frame-interpolation result, and the sample images, and the parameters of the fourth reference model and the parameters of the first training model are shared by the first training model and the fourth training model.

13. The device according to claim 12, wherein the preset rule further comprises:
selecting the first image frame and the Nth image frame in the at least one set of sub-sample images as the two fourth target sample image frames; wherein N is a positive integer greater than or equal to 5.

14. The device according to claim 13, wherein the total loss of the first training model comprises a first sub-loss, a second sub-loss, a third sub-loss, and a fourth sub-loss; wherein the first sub-loss is the loss between the first frame-interpolation result and first target frame-interpolation result, and the second sub-loss is the loss between the second frame-interpolation result and second target frame-interpolation result, the third sub-loss is the loss between the third frame-interpolation result and third target frame-interpolation result, and the fourth sub-loss is the loss between the fourth frame-interpolation result and fourth target frame-interpolation result;
wherein, the first target frame-interpolation result comprises the second image frame to the (N−3)th image frame in the N image frames, and the second target frame-interpolation result comprises the fourth image frame to the (N−1)th image frame in the N image frames, the third target frame-interpolation result comprises the third image frame to the (N−2)th image frame in the N image frames, and the fourth target frame-interpolation result comprises the fourth image frame in the N image frames.

15. A non-transitory computer-readable storage medium storing a computer program, wherein the computer program, when executed by a processor, implements a video frame interpolation method, comprising:
inputting at least two image frames into a video frame interpolation model to obtain at least one frame-interpolation image frame, wherein the video frame interpolation model is obtained by training an initial model and the training the initial model comprises:
obtaining the initial model and sample images, and the training the initial model by using a first loss to obtain a reference model;

obtaining a first training model comprising three identical reference models, selecting two first target sample image frames from the sample images according to a preset rule, and inputting the first target sample image frames into a first reference model of the first training model to obtain a first frame-interpolation result;

selecting two second target sample image frames from the sample images according to the preset rule, and inputting the second target sample image frames into a second reference model of the first training model to obtain a second frame-interpolation result;

selecting one frame-interpolation image from the first frame-interpolation result according to the preset rule and selecting one frame-interpolation image from the second frame-interpolation result according to the preset rule, wherein the frame-interpolation images selected are used as two third target sample image frames that are input into a third reference model of the first training model for calculation to obtain a third frame-interpolation result;

adjusting parameters of the first training model based on total loss of the first training model, wherein the total loss of the first training model is obtained based on the first frame-interpolation result, the second frame-interpolation result, and the third frame-interpolation result and the sample images, and the parameters are shared by each reference model of the first training model; and using a parameter model obtained via a predetermined number of iterations as the video frame interpolation model.

16. The non-transitory computer-readable storage medium according to claim 15, wherein the sample images comprise at least one set of sub-sample images, the at least one set of sub-sample images comprises N image frames, and the preset rule comprises:

selecting a first image frame and an (N−2)th image frame as the two first target sample image frames, wherein the first frame-interpolation result comprises first frame-interpolation images corresponding to a second image frame to an (N−3)th image frame respectively;

selecting a third image frame and an Nth image frame as the two second target sample image frames, wherein the second frame-interpolation result comprises second frame-interpolation images corresponding to a fourth image frame to an (N−1)th image frame respectively; and selecting the first frame-interpolation image corresponding to the second image frame and the second frame-interpolation image corresponding to the (N−1)th image frame as the two third target sample image frames;

wherein N is a positive integer greater than or equal to 5.

17. The non-transitory computer-readable storage medium according to claim 16, wherein the first training model further comprises a fourth reference model, and the fourth reference model is the same as the first reference model, and the video frame interpolation method further comprises:

selecting two fourth target sample image frames from the sample images according to the preset rule, and inputting the two fourth target sample image frames into the fourth reference model to obtain a fourth frame-interpolation result;

wherein, the total loss of the first training model is obtained based on the first frame-interpolation result, the second frame-interpolation result, the third frame-interpolation result, the fourth frame-interpolation result, and the sample images, and the parameters of the fourth reference model and the parameters of the first training model are shared by the first training model and the fourth training model.

18. The non-transitory computer-readable storage medium according to claim 17, wherein the preset rule further comprises:

selecting the first image frame and the Nth image frame in the at least one set of sub-sample images as the two fourth target sample image frames; wherein N is a positive integer greater than or equal to 5.

19. The non-transitory computer-readable storage medium according to claim 18, wherein the total loss of the first training model comprises a first sub-loss, a second sub-loss, a third sub-loss, and a fourth sub-loss;

wherein the first sub-loss is the loss between the first frame-interpolation result and first target frame-interpolation result, and the second sub-loss is the loss between the second frame-interpolation result and second target frame-interpolation result, the third sub-loss is the loss between the third frame-interpolation result and third target frame-interpolation result, and the fourth sub-loss is the loss between the fourth frame-interpolation result and fourth target frame-interpolation result;

wherein, the first target frame-interpolation result comprises the second image frame to the (N−3)th image frame in the N image frames, and the second target frame-interpolation result comprises the fourth image frame to the (N−1)th image frame in the N image frames, the third target frame-interpolation result comprises the third image frame to the (N−2)th image frame in the N image frames, and the fourth target frame-interpolation result comprises the fourth image frame in the N image frames.

20. The non-transitory computer-readable storage medium according to claim 17, wherein the video frame interpolation method further comprises:

calculating a first gradient based on the first frame-interpolation result and the sample images, storing the first frame-interpolation result and the first gradient, and clearing a calculation map of the first reference model;

calculating a second gradient based on the second frame-interpolation result and the sample images, storing the second frame-interpolation result and the second gradient, and clearing a calculation map of the second reference model;

calculating a third gradient based on the third frame-interpolation result and the sample images, storing the third frame-interpolation result and the third gradient, and clearing a calculation map of the third reference model; and calculating a fourth gradient based on the fourth frame-interpolation result and the sample images, storing the fourth frame-interpolation result and the fourth gradient, and clearing a calculation map of the fourth reference model.

* * * * *